Oct. 6, 1942.  A. A. KOTTMANN ET AL  2,297,710
SLICING MACHINE
Filed Nov. 26, 1940   2 Sheets-Sheet 1
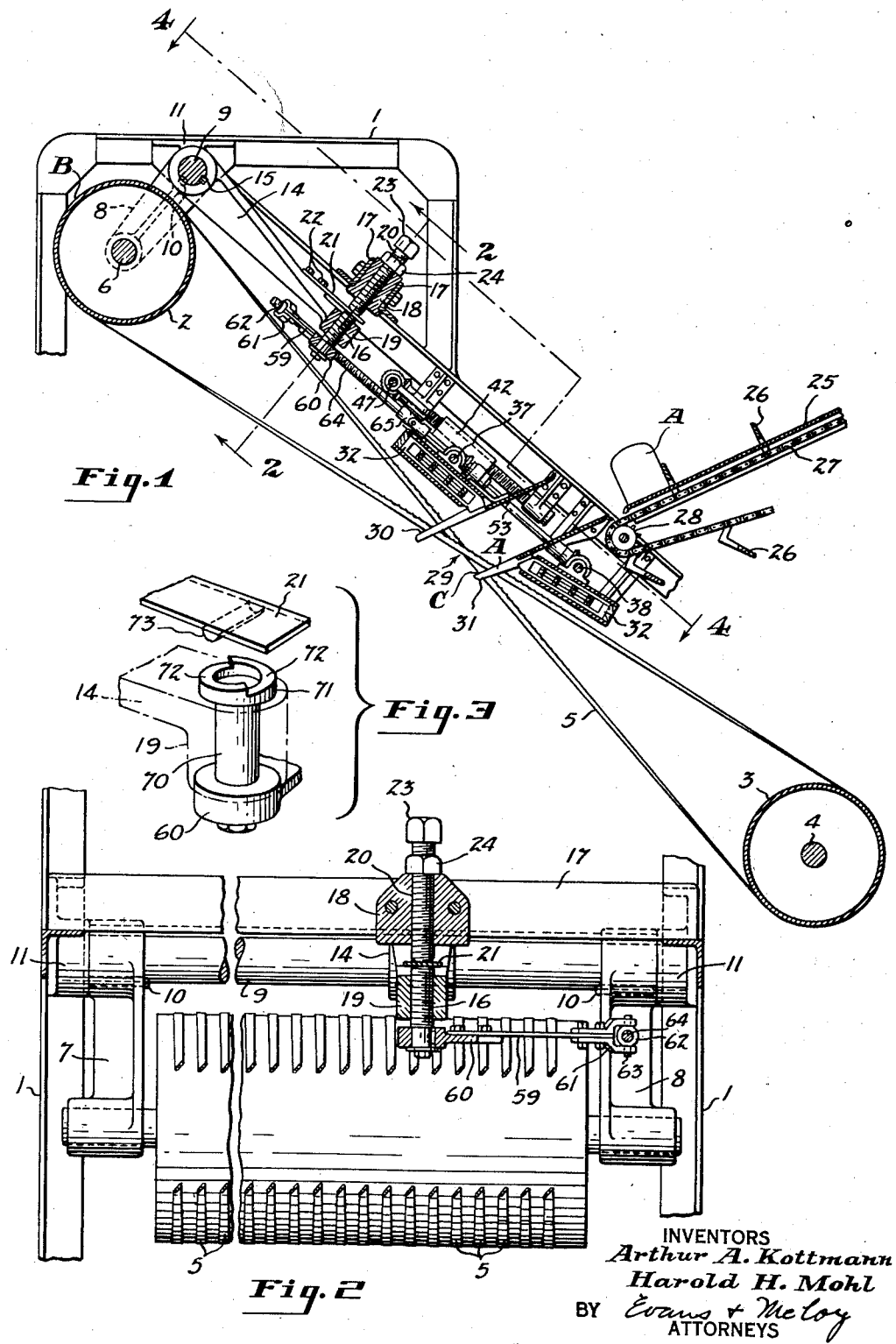
INVENTORS
*Arthur A. Kottmann*
*Harold H. Mohl*
BY *Evans + McCoy*
ATTORNEYS Patented Oct. 6, 1942

2,297,710

UNITED STATES PATENT OFFICE 2,297,710

SLICING MACHINE

Arthur A. Kottmann and Harold H. Mohl, Davenport, Iowa, assignors, by mesne assignments, to Micro-Westco, Inc., Bettendorf, Iowa, a corporation of Maryland Application November 26, 1940, Serial No. 367,254

8 Claims. (Cl. 146—88)

This invention relates to continuous band slicing machines, and more particularly to improved apparatus for controlling or regulating the tension in the cutters of band blade slicing machines.

Slicing machines of the endless band blade or cutter type have come into common use in bakeries and similar establishments for slicing bread. This type of slicer is favored because of its fast rate of slicing, the improved slicing characteristics obtainable, and because it can operate for a long period of time without being shut down for repairs or for resharpening of the cutters. It is, however, customary for bakers to merchandise bread loaves having different slice thicknesses and, accordingly, it has become necessary for the band type of bread slicer to be equipped with mechanism for varying the spacing between the adjacent cutters so that the slice thicknesses produced can be altered as desired. One of the most successful types of band blade slicers is that having a pair of spaced drums around which the cutter or cutters are trained, to be supported and actuated thereby. These drums are usually rigidly supported by the supporting structure or framework of the slicing machine in order that an adequate and appreciable tension of the order of about 50 to 100 pounds more or less can be maintained in the individual runs of the cutters. Accordingly, when the adjacent cutter runs are spread apart for the purpose of increasing the thickness of the slices produced, the length of the path or paths of the cutter or cutters is normally proportionately increased, resulting in a corresponding increase in tension of the cutter band or bands. This increase in tension in the cutter bands, especially when the spacing is varied over wide limits, is objectionable because of increased wear on the operating parts of the machine, as well as the possibility of breaking the cutters and the resultant danger to the operator running the machine. It is, therefore, an object of the invention to provide means for controlling the tension in the cutter band or bands and to eliminate objectionable blade tension variations normally incident to a variation in the spacing of the cutter runs.

When used for slicing ordinary white bread loaves, the cutters of a slicing machine are customarily adjusted to produce relatively thick slices, and when used to slice bread loaves such as rye the cutters are usually adjusted to produce relatively thin slices. However, rye bread has a tougher and harder texture than white bread, particularly with reference to the crust structure. Therefore, it is desirable to have more tension in the cutters when slicing rye bread than when slicing white bread. An increase in tension in the cutter band or bands tends to hold the cutters to their true path between the guides and prevents lateral deflection or twisting of the cutters when the hard or tough crusts of rye loaves are forced against the cutting edges. It is, therefore, another object of the invention to provide mechanism automatically operative when adjusting the cutter spacing of a band blade slicing machine from a relatively wide spacing for white loaves and the like to a relatively narrow spacing for rye loaves and the like to increase the tension in the cutters.

On opposite sides, usually above and below the slicing zone, the runs of the band cutters are customarily individually engaged by guide fingers. These fingers, which may be slotted, space the cutter bands and twist the same into approximately parallel cutting planes. When the adjacent runs are relatively closely spaced, as for example when adjusted to slice rye bread, the amount of cutter blade displacement required is relatively small. On the other hand, when the guides are widely spaced in adjusting the machine for cutting ordinary white bread, a considerable amount of displacement must be imparted to the cutter runs for the purpose of maintaining the portions thereof in the slicing zone in parallelism. It is, therefore, advantageous to provide means for decreasing the normal tension in the cutters when the latter are relatively widely spaced so that the wear on the guides may be minimized, and this is another object of the invention.

In addition to being able to vary the slice thickness produced, it is also necessary to adjust the height or size of the slicing zone. Therefore, most adjustable slice thickness band machines are provided with guides both above and below the slicing zone so that the cutter runs can be accurately controlled and one or both of the guide mechanisms is made bodily adjustable toward and away from the other so that the size of the slicing zone can be adjusted to accommodate loaves of different height. Therefore, it is another object of this invention to provide, in a slicing machine having a plurality of blade guide mechanisms, at least one of which is adjustable toward and away from the other, means operative in synchronism or in unison with the guide mechanisms for altering the normal tension in the bands produced by a variation in the spacing of the band runs for all positions of adjustment of the spacing mechanisms relative to one another.

Another object is to provide a generally improved band type slicing machine relatively simple in design and construction and inexpensive to manufacture. Other objects and advantages will become apparent from the following detailed description of a suitable embodiment of the invention which is made in connection with the accompanying drawings, in which:

Figure 1 is a fragmentary side elevational view, partly in section and with parts removed, of a crossed blade type of endless band slicing machine;

Fig. 2 is a sectional detail, with parts broken away and with parts removed, taken substantially on the line 2—2 of Fig. 1, and enlarged with respect to that figure;

Fig. 3 is an expanded perspective view with parts removed showing a modification of the mechanism for actuating the drum supporting means.

Figure 4:
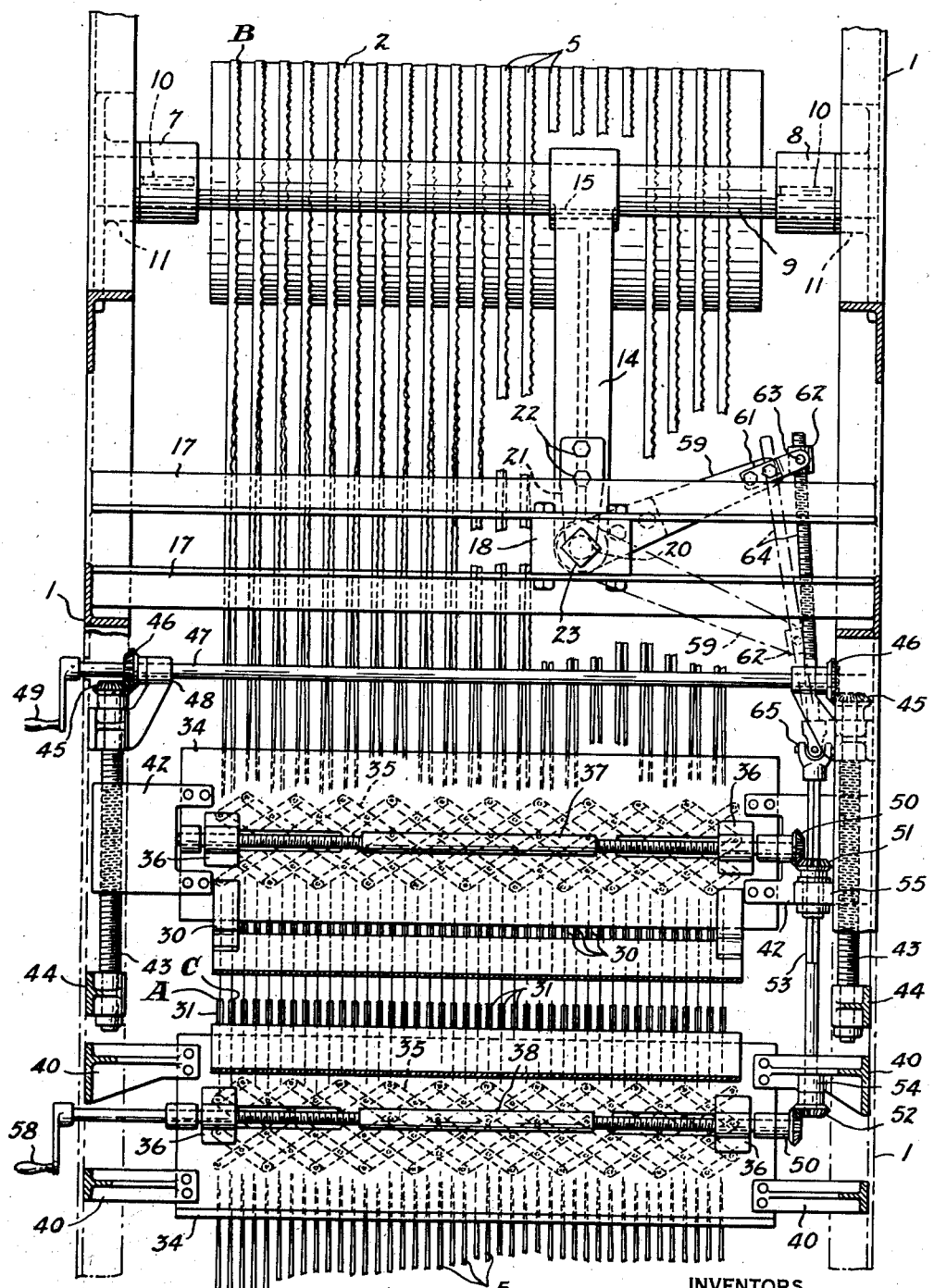
Fig. 4 is a transverse sectional view, with parts removed, taken substantially on the line 4—4 of Fig. 1 and drawn to approximately the same scale as that used in Fig. 2.

A part only of the complete slicing machine has been illustrated in the drawings, it being understood that conventional constructions of spaced drum or other slicing machines may be designed to incorporate the present invention. The several parts or elements of the slicing machine used to illustrate the present invention are identified in the drawings by numerals of reference which are the same throughout the several views. The slicing machine preferably has a supporting structure or framework 1 in which are rotatably mounted top and bottom drums 2 and 3. These drums are preferably of cylindrical form and are supported with their rotational axes parallel to one another. The bottom drum 3 may be rotatably mounted on a shaft 4 carried by the frame 1, the drum being suitably driven by a motor (not shown) to actuate cutter bands 5 trained around the drums 2 and 3 in conventional crossed relation.

Shaft 6 which carries the upper drum 2 is supported by spaced parallel arms 7 and 8 secured on a common transverse shaft 9 as by keys 10. The shaft 9 is journaled in brackets 11 secured to side members of the frame 1.

Intermediate the arms 7 and 8 an actuating member or arm 14 is secured on the shaft 9, as by a key 15. Thus, the member 14 with the arms 7 and 8 constitute a bell crank arrangement by means of which the drum 2 is supported for movement toward and away from the drum 3.

The end of the arm 14 remote from the shaft 9 threadedly receives a bolt or screw 16 which is disposed so that the longitudinal axis thereof is approximately tangent to a circle centered at the axis of the shaft 9 and lying in a plane normal thereto.

A pair of parallel transverse members 17 are secured to the frame 1 and intermediate their ends support a threaded block 18 disposed adjacent the end 19 of the arm or lever 14. A screw 20 threaded through the block 18 and aligned with the screw 16 is arranged to bear against a flexible separating plate or element 21 secured to arm 14 as by screws 22. Thus, by adjustment of either the screw 16 or the screw 20, the pivotal position of the arm or lever member 14 about the shaft 9 can be altered. The plate element 21 prevents the rotation of one screw from imparting a corresponding rotation to the other screw, while being of sufficient yieldability to provide for movement of the arm 14 when the screw 16 is actuated. The screw 20 may be turned as desired by means of a suitable wrench applied to head 23 thereof, and if desided, a lock nut 24 may be provided to seat against the block 18 and thereby prevent inadvertent rotation of the screw 18.

An infeed conveyor having an article supporting apron 25 and spaced flights 26 carried by spaced parallel side belts or chains, one of which is indicated at 27, trained around rotatable members, one of which is indicated at 28, is arranged to advance articles or bread loaves, such as that indicated at A, into the slicing machine. The conveyor rotatable member 28 may be journaled in the machine frame 1 and is so located that articles fed into the machine by the infeed conveyor pass through a slicing zone intermediate the drums 2 and 3 in the vicinity of region 29 where the runs of the cutters 5 cross one another.

Above and below the slicing zone the runs of the cutters 5 are individually engaged by guide fingers 30 and 31. These fingers are mounted on members 32 disposed in side by side relation in supporting houses or cases 34. The specific means for actuating the guide fingers 30 and 31 forms the subject matter of the copending application of Earl C. Vollmer and Frederick A. Herwehe, Serial No. 260,044. Briefly, the actuating mechanism for each set of guides comprises a lazy tongs 35, the ends of which are connected to blocks 36 threadedly received on the oppositely threaded ends of rods 37 and 38 for the upper and lower blade guide assemblies, respectively. Rotation of the rods or shafts 37 and 38 in one direction draws the blocks 36 of each guide assembly toward one another so as to contract the lazy tongs 35 and thereby reduce the spacing between the members 32 and the guide fingers 30 and 31 while rotation of the rods 37 and 38 in the opposcite direction expands the lazy tongs to increase the spacing between the members 32 and the guide fingers 30 and 31.

The lower blade guide assembly is disposed transversely across the machine below the path of loaves or articles A moving to the slicing zone and is supported by bracket members 40 which are attached to the framework or supporting structure 1 and are secured to the housing or box-like structure 34 of the guide assembly. The upper blade guide assembly is disposed transversely across the machine above the path of the articles A moving into the slicing zone, and is supported by bracket members 42 threadedly mounted on rotatable threaded rods 43 journaled in brackets 44 carried by the side frames of the machine. Bevel gears 45 are secured on the upper ends of the threaded rods 43 and mesh with bevel gears 46 secured on a transverse shaft 47 journaled in extension portions 48 of the uppermost brackets 44 on each side of the machine. By this arrangement the threaded rods 43 may be synchronously rotated to move the upper blade guide assembly toward and away from the lower blade guide assembly for maintaining the assemblies in parallelism. If desired, the operating shaft 47 may be extended beyond the frame 1 and fitted with a crank 49 for actuating the same.

The shafts 37 and 38 of the upper and lower blade guide assemblies, respectively, each has a bevel gear 50 secured thereon and meshed with bevel gears 51 and 52 carried by a square sectioned rod 53. This rod, suitably held against endwise movement, may be journaled at 54 in one of the support brackets 40 for the lower blade guide assembly and in a journal 55 on one of the movable support brackets 42 of the upper blade guide assembly. The bevel gear 51, which meshes with the bevel gear 50 on the rod or shaft 37 of the upper blade guide assembly, is splined or otherwise arranged for longitudinal sliding movement on the square shaft or rod 53, so that it may move therealong while maintaining a driving connection as the upper blade guide assembly is adjusted toward or away from the lower blade guide assembly. A crank 58 secured exteriorly of the machine supporting structure or frame 1 on an extension portion of the oppositely threaded rod 38 may be operated to rotate the latter to vary the spacing of the lower guide fingers 31. A corresponding rotation is imparted to the oppositely threaded rod 37 of the upper blade guide assembly by means of the square rod 53 which is drivingly connected to both rods 37 and 38 for all positions of adjustment of the upper blade guide assembly on the threaded rods 43, through the bevel gears 50, 51 and 52.

As the bifurcated guide fingers 30 and 31 are moved apart to increase the spacing between adjacent runs of the cutter bands 5, the length of each cutter band path around the drums 2 and 3 is slightly increased if the drums are held in fixed positions.

Referring to Fig. 4, one of the cutter bands has been marked A and C at the points where it passes through adjacent guide fingers of the lower guide assembly, and has been marked B at the point where it passes over the upper drum 2. If these points be projected onto a plane through the axes of the drums, they will determine an isosceles triangle. When the spacing of the guides 31 is decreased, the legs AB and CB of the triangle move apart and increase slightly in length. It is this change in length of the portions of the various cutter runs forming triangles corresponding to the triangle ABC just described that would normally alter the tension in the cutters if the drums 2 and 3 were maintained on fixed centers. By the present invention we propose to move the axes of the drums 2 and 3 toward or away from one another so as to maintain the legs AB and CB of the above mentioned triangle approximately constant in length or of such lengths as will establish a predetermined tension or tensions in the cutter runs for each setting of the blade spacing apparatus.

While the lengthening of the cutter band path upon variation in slice thickness adjustment may be relatively small, a considerable increase in tension in the cutter bands is produced, which may be objectionable for several reasons. For example, the wear on the fingers 30 and 31 which must twist, bend, and guide the runs of the cutters, may become excessive and the increased tension may result in breakage of the bands, endangering the operator of the machine. Therefore, in order to compensate for the normal increase in blade tension upon an increase in spacing of the cutter runs, as well as to provide for a positive decrease in tension of the cutter bands upon an increase in slice thickness, as will later appear, the present invention contemplates a mechanism for actuating the screw 16 synchronously with the actuation of the blade spacing mechanism so that the compensation or control of the band blade tension is effected in unison with the slice thickness adjustment. This mechanism includes an arm having a relatively wide thin portion 59 of spring steel or the like which is flexible in a direction longitudinally of the screw 16 and rigid in the direction tending to rotate the screw 16. The flexible arm has a hub end 60 which is rigidly secured on one end of the screw 16 so that actuation of the arm operates to rotate the screw in the end 19 of the arm or control member 14. The flexible portion 59 of the arm is so disposed that the arm may be bent or displaced laterally in a direction paralleling the action of the screw 16 by flexure of the spring steel, thus yielding to compensate for the shifting of the screw. The arm has a two-part forked end 61 which receives a nut member 62 having trunnions 63 pivoted in the forked end 61 of the flexible arm. This nut 62 receives a threaded rod 64 connected by a universal joint 65 to the upper end of the square rod 53 for rotation with the latter. As the square rod 53 is rotated by means of the crank 58 in adjusting the spacing of the guide fingers 30 and 31, the threaded rod 64 is rotated in unison so that the threaded block 62 is moved along the rod 64, causing a pivotal movement of the flexible arm and resulting in rotative movement of the screw 16 in the control member or arm 14.

When the lazy tongs 35 of the blade spacing mechanisms are fully expanded substantially as shown in Fig. 4, the flexible arm on the screw 16 is disposed substantially in the position illustrated by the full lines of that figure, and when the lazy tongs are contracted by movement of the blocks 36 toward one another on the oppositely threaded rods 37 and 38, the flexible arm is drawn or pivoted downwardly to approximately the position illustrated by the broken lines of Fig. 4. This pivotal movement of the flexible arm from the full line position of Fig. 4 to the broken line position of that figure turns the screw 16 so as to shift the latter longitudinally or axially through the end 19 of the control member or arm 14. Thus, the screw 16 is slightly projected through the end of the control arm to bear against the separating element 21 and the screw 20 and to cause a slight shifting of the control arm 14 in a clockwise direction, as viewed in Fig. 1. This slight shifting of the control arm operates through the shaft 9 and arms 7 and 8 to shift the shaft 6 carrying the drum 2 away from the shaft 4 carrying the drum 3, so that the spacing between the drums is slightly increased. It is, therefore, apparent that the movement of the flexible arm between the positions illustrated in Fig. 4 incident to the contracting of the lazy tongs to decrease the spacing of the guide fingers for the cutter runs is operative to slightly but automatically increase the spacing of the drums 2 and 3 so as to compensate for the normal slackening of the tension in the cutter bands upon movement of the adjacent runs thereof closer together.

As previously mentioned, it is desirable that for relatively wide spacing of the adjacent cutter runs the tension in the cutter bands be less than for relatively narrow spacing of the runs of the cutters. Therefore, the pitch of the threads on the screw 16 is calculated or designed so that the shifting movement imparted to the control arm or member 14 upon actuation of the flexible arm is slightly greater than required to compensate for the normal change in tension in the cutters 5 incident to the alteration in the length of the cutter paths accompanying the decreased cutter run spacing. Accordingly, the drum 2 is shifted by the control arm 14 away from the drum 3 a greater amount than necessary to compensate for the decrease in tension caused by the movement together of the cutter runs when the spacing therebetween is diminished, and operates to increase the tension in the cutter bands 5 over that which prevailed at the wider spacing between the adjacent cutter runs. Conversely, when the lazy tongs 35 are expanded to the positions shown in Fig. 4 from a contracted position, the resultant pivotal movement or shifting of the control arm 14 in a counterclockwise direction as viewed in Fig. 1, may be greater than required to compensate for the normal increase in tension resulting from the separation of the adjacent runs of the cutter bands. Therefore, as the lazy tongs or other blade spacing mechanism is expanded to increase the spacing of the cutter runs, one of the band supporting drums is shifted or moved toward the other band supporting drum more than enough to compensate for the change in shape or length of the cutter band path and effects a reduction in tension in each of the cutter bands by providing a shorter path for the cutters.

Slicing machines in which the distance between the blade supporting drums is relatively small require a greater movement of the drum axes toward or away from one another to compensate for variations in the spacing between adjacent cutters than machines in which the blade supporting drums are spaced relatively far apart. The closer the blade supporting drums are together, the shorter are the legs AB and CB of the triangle ABC relative to the base AC. In fact, for very close spacing of the drums 2 and 3, the legs AB and CB may be so short that a screw such as 16, providing for substantially uniform shifting of the drum 2 toward the drum 3 as the cutter spacing is varied, may be inadequate to properly compensate for the change in length of the legs AB and CB of the aforementioned cutter band triangle. This is for the reason that as the spacing of the bands increase, the legs AB and CB of the triangle ABC formed by each of the blades increases rapidly. Such increase is not uniform with the spacing but is an accelerated function thereof. In order to give the movable drum the required accelerated motion which will keep the blade path and consequently the blade tension substantially constant, the modification shown in Fig. 3 or its equivalent may be used.

In this modification the screw 16 is replaced by a rotatable spindle 70. This spindle is secured in the hub end 60 of the flexible arm 59 previously described and extends through a journal or bearing sleeve in the end 19 of the lever member 14 and is formed with an enlarged head 71 having axially directed arcuate cam surfaces 72. The flexible separating plate 21, previously described, has a transversely disposed bearing member 73 secured thereto so as to normally rest on the cam surfaces 72. The member 73 has a relatively small area of contact with each of the cam surfaces 72 and rides over the latter as the spindle 70 and head 71 thereof are rotated by the movement of the arm 59 previously described. The cam surfaces 72 are formed to provide movement of the arm 14 that will shift the drum 2 and maintain the cutter bands under a constant or predetermined tension.

In apparatus wherein it is desirable to provide for an increased tension in the cutter bands upon a decrease in slice thickness adjustment, the cam surfaces 72 may be so formed that the drum 2 is shifted away from the drum 3 a greater amount than is required to compensate for the normal decrease in length of the cutter band triangle ABC resulting from a decrease in the slice thickness adjustment. Thus, the increase in size of the cutter band path produces an increase in tension of the cutter bands. Conversely, as the blade or cutter spacing is increased, the drum axes may be moved together more than required to compensate for the increased length of the cutter band path, thereby shortening such path and reducing the tension in the bands.

While the present invention provides means for automatically varying the tension in the cutter bands upon a change in the spacing between adjacent cutter runs, there is incorporated in the machine means for adjusting one blade spacing assembly toward and away from the other blade spacing assembly while maintaining the synchronous relation between the several blade spacing assemblies and without interfering with the interconnection between the blade spacing assemblies and the blade tension adjusting means.

The principles of the present invention may be utilized in various ways, numerous modifications and alterations being contemplated, substitution of parts and changes in construction being resorted to as desired, it being understood that the embodiments shown in the drawings and described above are given merely for purposes of explanation and illustration without intending to limit the scope of the claims to the specific details desclosed.

What we claim is:

1. In a band blade slicing machine, a supporting structure, a pair of spaced drums rotatably mounted on the structure, the mounting means for one of the drums including a member actuable to shift such drum toward and away from the other drum, a plurality of endless cutter bands trained around the drums in side by side relation, guides individually engageable with the runs of the cutters intermediate the drums to space the cutter runs for movement in approximate parallelism through a slicing zone, means having connection with the guides and operative to vary the spacing of the guides with respect to one another, and means connecting said operative means with said member to effect shifting of the shiftable drum concurrently with the variations in spacing of the cutter runs by the guides to provide for drawing together of the band drums upon an increase in spacing of the cutter runs.

2. In a slicing machine, a supporting structure, a pair of spaced drums carried by the structure, one of the drums being carried by a pivoted arm for movement toward and away from the other drum, endless cutter means trained around the drums and extending therebetween, guides individually engageable with the runs of the cutters between the drums to uniformly space the runs, means operative to simultaneously shift the guides toward and away from one another to thereby vary the spacing between the cutter runs, movable means for holding the arm against pivotal movement to maintain a constant spacing between the drums, and means having connection with the operative means to pivot the arm in unison with the movement of the guides to vary the spacing of the cutter runs.

3. In a slicing machine having endless band cutter means trained under tension about spaced rotatable members, adjustable means engageable with individual runs of the cutter means to space and guide the same intermediate the rotatable members, means actuable to vary the tension in the cutter means, and means having operative connection with the spacing and guiding means and also with the tension varying means and operable to actuate the tension varying means in unison with and proportionately to the adjustment concurrently imparted to the spacing and guiding means.

4. In a slicing machine having endless band cutter means trained under tension about spaced rotatable members, adjustable means engageable with individual runs of the cutter means to space and guide the same intermediate the rotatable members, means actuable to vary the tension in the cutter means, and means having operative connection with the spacing and guiding means and also with the tension varying means and operable to simultaneously decrease the spacing between adjacent runs of the cutter means and increase the tension in the endless band cutter means.

5. In a slicing machine having endless band cutter means trained under tension about spaced rotatable members, adjustable means engageable with individual runs of the cutter means to space and guide the same intermediate the rotatable members, means actuable to vary the tension in the cutter means, and rotatable means having operative connection with the spacing and guiding means and also with the tension varying means, said rotatable means being operable in one direction to simultaneously decrease the spacing between adjacent runs of the endless cutter band means and increase the tension in such cutter means, and operable in a reverse direction to simultaneously increase the spacing between said adjacent cutter runs and decrease the tension in such cutter means.

6. In a slicing machine, a supporting structure, a pair of spaced drums rotatably mounted on the structure, a plurality of endless cutter bands trained around the drums under tension and in side by side relation, adjustable means engaging individual runs of the cutter bands to space and guide the same intermediate the drums, means having connection with the adjustable means and operable to vary the spacing between the guide means and the cutter runs engaged thereby, the mounting means for one of said drums including a member actuable to shift such drum toward and away from the other drum, and means including a cam connecting said operable means with said member to effect shifting of said one drum concurrently with the variation in spacing of the cutter runs by the guide means to provide for drawing together of the band drums upon an increase in spacing of the cutter runs.

7. In a slicing machine having endless band cutter means trained under tension about spaced rotatable members, adjustable means engageable with individual runs of the cutter means to space and guide the same intermediate the rotatable members, means actuable to vary the tension in the cutter means, means having operative connection with the spacing and guiding means and also with the tension varying means and operable to actuate the tension varying means in unison with and proportionately to the adjustment concurrently imparted to the spacing and guiding means, and separate means having connection with the tension varying means and operative to actuate the tension varying means independently of the spacing and guiding means.

8. In a slicing machine having spaced drums and endless cutter bands trained therearound under tension, adjustable means individually engaging the cutter runs intermediate the drums to space and guide portions of the runs in spaced approximately parallel cutting planes, means actuable to vary the tension in the cutter bands, and means having operative connection with the spacing and guiding means and also with the tension varying means and operable to adjust the spacing and guiding means and actuate the tension varying means proportionately and in unison to thereby compensate for changes in cutter band tension simultaneously with the changes in cutter run spacing causing the same.

ARTHUR A. KOTTMANN.
HAROLD H. MOHL.